(12) United States Patent
Uenishi et al.

(10) Patent No.: US 6,864,214 B2
(45) Date of Patent: Mar. 8, 2005

(54) EXHAUST GAS PURIFYING CATALYST (75) Inventors: Mari Uenishi, Ikeda (JP); Isao Tan, Ikeda (JP); Hirohisa Tanaka, Ikeda (JP)

(73) Assignee: Daihatsu Motor Co., Ltd., Osaka (JP)

( * ) Notice: Subject to any disclaimer, the term of this patent is extended or adjusted under 35 U.S.C. 154(b) by 111 days.

(21) Appl. No.: 09/960,325

(22) Filed: Sep. 24, 2001

(65) Prior Publication Data
US 2002/0061816 A1 May 23, 2002

(30) Foreign Application Priority Data
Sep. 26, 2000 (JP) .......................................... 2000-292183

(51) Int. Cl.[7] .......................... B01J 23/00; B01J 23/44; B01J 23/42; B01J 8/02
(52) U.S. Cl. ...................... 502/304; 502/333; 502/334; 423/213.2; 423/213.5
(58) Field of Search ................ 502/300–355; 423/212–213.7

(56) References Cited

U.S. PATENT DOCUMENTS

| | | | | |
|---|---|---|---|---|
| 5,888,464 A | * | 3/1999 | Wu et al. ................ | 423/213.5 |
| 5,945,369 A | * | 8/1999 | Kimura et al. ............ | 502/304 |
| 5,989,507 A | * | 11/1999 | Sung et al. .............. | 423/213.5 |
| 6,214,306 B1 | * | 4/2001 | Aubert et al. ............ | 423/213.2 |
| 6,492,297 B1 | * | 12/2002 | Sung ..................... | 502/304 |

FOREIGN PATENT DOCUMENTS

| | | | | |
|---|---|---|---|---|
| EP | 0 998 890 A2 | 3/2000 | ............ | B01J/23/63 |
| EP | 1 013 334 A1 | 6/2000 | ............ | B01D/53/94 |
| EP | 1 052 008 A1 | 11/2000 | ............ | B01D/53/94 |
| EP | 1 053 779 A1 | 11/2000 | ............ | B01D/53/94 |
| JP | 62-071543 | 4/1987 | ............ | B01J/23/56 |
| JP | 08-332350 | 12/1996 | ............ | B01D/53/94 |
| JP | 10-202105 | 8/1998 | ............ | B01J/23/46 |
| JP | 2001-227335 | 8/2001 | ............. | F01N/3/28 |

OTHER PUBLICATIONS

US 2001/0031699 A1 09/803,908.*
US 2002/0032124 A1 09/902570.*
US 2001/0046941 A1 09/818,998.*
US 2002/0107141 A1 10/014,207.*
Patent Abstracts of Japan, publication No. 62–071543, date of publication Apr. 2, 1987.
Patent Abstracts of Japan, publication No. 08–332350, date of publication Dec. 17, 1996.
Patent Abstracts of Japan, publication No. 10–202105, date of publication Aug. 4, 1998.
Patent Abstracts of Japan, publication No. 2001–227335, date of publication Aug. 24, 2001.

* cited by examiner

*Primary Examiner*—Steven Bos
*Assistant Examiner*—William G. Wright, Sr.
(74) *Attorney, Agent, or Firm*—Dickinson Wright PLLC; Jean C. Edwards (57) ABSTRACT

To provide an exhaust gas purifying catalyst that requires a smallest possible quantity of rhodium for developing the activity effectively, so as to produce an excellent purifying performance economically, a zirconium complex oxide on which rhodium and platinum are previously supported, and a cerium complex oxide on which platinum and/or palladium are previously supported are contained in an exhaust gas purifying catalyst.

16 Claims, 1 Drawing Sheet

FIG. 1

EXHAUST GAS PURIFYING CATALYST

BACKGROUND OF THE INVENTION

1. Field of the Invention

The present invention relates to an exhaust gas purifying catalyst for effectively purifying carbon monoxides (CO), hydrocarbons (HC) and nitrogen oxides (NOx) contained in exhaust gas from an automotive engine.

2. Description of Background Art

Three-way catalysts for simultaneously purifying carbon monoxides (CO), hydrocarbons (HC) and nitrogen oxides (NOx) contained in the exhaust gas usually support noble metals such as platinum, rhodium and palladium, and are now in wide use as exhaust gas purifying catalysts. Of these noble metals supported in the exhaust gas purifying catalysts, rhodium exhibits excellent activity for oxidation and reduction and develops the excellent effect in purification of NOx in particular. For this reason, a variety of proposed exhaust gas purifying catalysts use rhodium as their essential component and support platinum or palladium in combination with the rhodium.

In the meantime, rhodium is expensive and there has been a strong industrial desire to produce an exhaust gas purifying catalyst that requires a smallest possible quantity of rhodium for effectively developing the equivalent effect.

It is the object of the present invention to provide an exhaust gas purifying catalyst that requires a smallest possible quantity of rhodium for effectively developing the activity to produce an excellent purifying performance economically.

SUMMARY OF THE INVENTION

The present invention provides a novel exhaust gas purifying catalyst comprising a zirconium complex oxide on which rhodium and platinum are previously supported, and a cerium complex oxide on which platinum and/or palladium are previously supported.

It is preferable that the zirconium complex oxide comprises zirconium and cerium in the proportion of a zirconium content being more than a cerium content, and the cerium complex oxide comprises cerium and zirconium in the proportion of a cerium content being more than a zirconium content.

In the exhaust gas purifying catalyst of the present invention, it is preferable that the zirconium complex oxide is the heat-resisting oxide expressed by the general formula (1) given below:

$$Zr_{1-(a+b)}Ce_a N_b O_{2-c} \quad (1)$$

(In the formula, N represents alkali earth metal or rare earth metal, c represents oxygen vacancy, a represents a proportion of atom of 0.10–0.35, b represents a proportion of atom of 0–0.20, and 1–(a+b) represents a proportion of atom of 0.45–0.90), and that the cerium complex oxide is the heat-resisting oxide expressed by the general formula (2) given below:

$$Ce_{1-(x+y)}Zr_x M_y O_{2-z} \quad (2)$$

(In the formula, M represents alkali earth metal or rare earth metal, z represents oxygen vacancy, x represents a proportion of atom of 0.20–0.70, y represents a proportion of atom of 0–0.20, and 1–(x+y) represents a proportion of atom of 0.10–0.80).

It is preferable that the alkali earth metal represented by N in the general formula (1) and the alkali earth metal represented by M in the general formula (2) comprises at least one material selected from the group consisting of Mg, Ca, Sr and Ba, and the rare earth metal represented by N in the general formula (1) and the rare earth metal represented by M in the general formula (2) comprises at least one material selected from the group consisting of Y, Sc, La, Pr and Nd.

Preferably, the exhaust gas purifying catalyst of the present invention is in the form of a coating layer formed on a catalyst carrier. Also, it is preferable that a quantity of rhodium supported is less than 1 g per liter of catalyst carrier.

The exhaust gas purifying catalyst of the present invention may further comprise alumina on which platinum and/or palladium may be supported.

It is preferable that at least a part of the zirconium complex oxide and/or the cerium complex oxide is a solid solution. Further, it is preferable that the platinum to be supported on the zirconium complex oxide and on the cerium complex oxide is supported in a proportion that a quantity of the platinum supported on the cerium complex oxide is in the range of 1–5 parts by weight per part by weight of the platinum supported on the zirconium complex oxide.

The exhaust gas purifying catalyst of the present invention is preferably in the form of an outermost layer of the coating layer having multiple layers and formed on the catalyst carrier.

The exhaust gas purifying catalyst of the present invention can require only a small quantity of rhodium that exhibits the excellent activity for both oxidation and reduction and develops the excellent effect in purification of NOx in particular, for developing the activity effectively and producing an excellent purifying performance economically even in endurance running at high temperature. Accordingly, the exhaust gas purifying catalyst of the present invention is suitably used as the automotive exhaust gas purifying catalyst.

DETAILED DESCRIPTION OF PREFERRED EMBODIMENTS

An exhaust gas purifying catalyst of the present invention comprises a zirconium complex oxide on which rhodium and platinum are previously supported and a cerium complex oxide on which platinum and/or palladium are previously supported.

It is preferable that the zirconium complex oxide comprises zirconium and cerium in the proportion of a zirconium content being more than a cerium content, and the zirconium complex oxide is the heat-resisting oxide expressed by the following general formula (1):

$$Zr_{1-(a+b)}Ce_a N_b O_{2-c} \quad (1)$$

(In the formula, N represents alkali earth metal or rare earth metal, c represents oxygen vacancy, a represents a proportion of atom of 0.10–0.35, b represents a proportion of atom of 0–0.20, and 1–(a+b) represents a proportion of atom of 0.45–0.90).

The alkali earth metals represented by N includes, for example, Be (beryllium), Mg (magnesium), Ca (calcium), Sr (strontium), Ba (barium), and Ra (radium). Mg, Ca, Sr and Ba can be cited as the preferable alkali earth metal. The rare earth metals represented by N include, for example, Y (yttrium), Sc (scandium), La (lanthanum), Pr (praseodymium), Nd (neodymium), Pm (promethium), Sm (samarium), Eu (europium), Gd (gadolinium), Th (terbium), Dy (dysprosium), Ho (holmium), Er (erbium), Tm (thulium), Yb (ytterbium), and Lu (lutetium). Y, Sc, La, Pr and Nd can be cited as the preferable rare earth metal. These alkali earth metals or the rare earth metals may be used in single or in combination of two or more.

The proportion of atom of N represented by b is in the range of 0–0.20, which means that no N is contained as the component of heat-resisting oxide or not more than 0.20 of N is contained, if any. When the proportion of atom of N exceeds 0.20, the specific surface area may reduce.

The proportion of atom of cerium (Ce) represented by a is in the range of 0.10–0.35. When the proportion of atom of Ce is less than 0.10, the specific surface area may reduce.

Consequently, the proportion of atom of zirconium (Zr) represented by 1−(a+b) is preferably in the range of 0.45 to 0.90. When this range is not fulfilled, an intended specific surface area and an intended heat resisting property may not be provided. Further preferably, the proportion of atom of Zr is in the range of 0.65–0.90.

In the formula (1), c represents oxygen vacancy, which means a proportion of vacancy formed in a fluorite crystal lattice usually formed via the oxides of Zr, Ce and N.

This zirconium complex oxide can be produced with a known method. To cite an instance, powder of cerium oxide is added with water to form slurry, first. Then, an aqueous solution in which zirconium salt and alkali earth metal salt and/or rare earth metal salt are mixed at a prescribed stoichiometric ratio is added to the slurry and fully stirred. Then, the mixture is oxidized.

The powder of cerium oxide of large specific surface area should preferably be used to provide an increased oxygen storage capacity, though a commercially available powder of cerium oxide can be used. The slurry is formed by adding about 10–50 parts by weight of water per part by weight of powder of cerium oxide.

Salts of the zirconium salt and alkali earth metal salt and/or rare earth metal salt include, for example, inorganic salts such as sulfate, nitrate, hydrochloride and phosphate, and organic acid salts such as acetate and oxalate. Nitrate can be cited as the preferable one. The zirconium salt and the alkali earth metal salt and/or the rare earth metal salt are dissolved in water in a proportion of 1 part by weight of each to 0.1–10 parts by weight of water so that they comes to be within the range of the above-mentioned specific proportion of atom at the prescribed stoichiometric ratio, to thereby produce mixed aqueous solution.

After the mixed aqueous solution is added to the slurry mentioned above and fully mixed by stirring, the mixture is oxidized. The oxidization process can be performed as follows. First, the mixture is dried under reduced pressure by use of a vacuum dryer, preferably at about 50–200° C. for about 1–48 hours, to thereby produce the dried material. Then, the dried material is baked at about 350–1,000° C., or preferably about 400–700° C., for about 1–12 hours, or preferably about 2–4 hours. Preferably, in the baking procedure, at least a part of the heat-resisting oxide is allowed to turn into a solid solution, to improve the heat-resisting property of the hear-resisting oxide. Desirable baking conditions for forming the solid solution are properly determined, depending on the composition of the heat-resisting oxide and the proportion thereof The zirconium complex oxide can also be obtained in the following method as well. First, a salt solution containing zirconium, cerium and alkali earth metal and/or rare earth metal is prepared in such a manner as to establish a pre-scribed stoichiometric ratio. Then, an aqueous alkaline solution is added in the solution, to coprecipitate the salts including zirconium, cerium and alkali earth metal and/or rare earth metal. Then, the coprecipitated material is oxidized. In this method, the salts illustrated above can be cited as the salts used. The aqueous alkaline solutions that can properly be used include, for example, known buffer, in addition to aqueous solution of salts of alkali metals such as sodium and potassium and ammonia. Preferably, the aqueous alkalie solution is so prepared that after the addition of the aqueous alkali solution, the solution can have a PH of about 8–11. The oxidization process identical to the process mentioned above can be taken after the coprecipitated material is filtrated and washed.

Further, the zirconium complex oxide can be obtained in the following method. First, a mixed alkoxide solution including zirconium, cerium and alkali earth metal and/or rare earth metal is prepared in such a manner as to establish a prescribed stoichiometric ratio. Then, deionized water is added in the mixed alkoxide solution to cause coprecipitation or hydrolysis. Then, the coprecipitated product or the hydrolyzed product is oxidized. In this method, the mixed alkoxide solution can be prepared by mixing the alcoholates of zirconium, cerium and alkali earth metal and/or rare earth metal in an organic solvent such as toluene and xylene. The alkoxides to form the alcoholates include methoxide, ethoxide, propoxide, butoxide and alkoxyalkolate thereof such as ethoxyethylate or methoxypropylate. The oxidization process identical to that mentioned above can be taken after the coprecipitated product or the hydrolyzed product is filtrated and washed.

It is preferable that the cerium complex oxide comprises cerium and zirconium in the proportion of a cerium content being more than a zirconium content, and the cerium complex oxide is the heat-resisting oxide expressed by the following general formula (2):

$$Ce_{1-(x+y)}Zr_xM_yO_{2-z} \qquad (2)$$

(In the formula, M represents alkali earth metal or rare earth metal, z represents oxygen vacancy, x represents a proportion of atom of 0.20–0.70, y represents a proportion of atom of 0–0.20, and 1−(x+y) represents a proportion of atom of 0.10–0.80).

The alkali earth metals or rare earth metals represented by M include the same as those mentioned above. Mg, Ca, Sr and Ba can be cited as the preferable alkali earth metal. Y, Sc, La, Pr and Nd can be cited as the preferable rare earth metal. These alkali earth metals or the rare earth metals may be used in single or in combination of two or more.

The proportion of atom of M represented by y is in the range of 0–0.20, which means that no M is contained as the component of heat-resisting oxide or not more than 0.20 of M is contained, if any.

The proportion of atom of Zr represented by x is in the range of 0.20–0.70. Deterioration of the heat resisting property may be caused when the proportion of atom of Zr is less than 0.20. On the other hand, deterioration of oxygen storage capacity may be caused due to the lack of Ce when the proportion of atom of Zr is more than 0.70.

Consequently, the proportion of atom of Ce represented by 1−(x+y) is in the range of 0.10 to 0.80. Further preferably, the proportion of atom of Ce is in the range of 0.35–0.70.

Z represents oxygen vacancy, which means a proportion of vacancy formed in a fluorite crystal lattice usually formed via the oxides of Ce, Zr and M.

This cerium complex oxide can be obtained with a known method using the same process as that mentioned above.

In the exhaust gas purifying catalyst of the present invention, rhodium and platinum are previously supported on zirconium complex oxide. The activity of rhodium can be developed effectively by supporting rhodium and platinum on zirconium complex oxide.

The method of allowing rhodium and platinum to be supported on the zirconium complex oxide is not limited to any particular method. Any of the known methods may be used. To cite an instance, after salt solution containing rhodium and salt solution containing platinum are prepared, respectively, the zirconium complex oxide is impregnated with the salt solutions in sequence and then is baked.

In this method, the salt solution illustrated above may be used for the salt-contained solution. In practice, aqueous nitrate solution, dinitrodiammine nitric acid solution, aqueous chloride salt solution and the like are used. To be more specific, rhodium salt solutions that may preferably be used include, for example, rhodium nitrate solution and rhodium chloride solution, and platinate solutions that may preferably be used include, for example, dinitrodiammine platinum nitrate solution, chloroplatinic solution and quadrivalent platinum ammine solution. Preferably, after the zirconium complex oxide is impregnated with rhodium and platinum, it is dried at about 50–200° C. for about 1–48 hours for each of the impregnations and further is baked at about 350–1,000° C. for about 1–12 hours. Another method may alternatively be taken that after a salt solution containing both of rhodium and platinum is prepared, the zirconium complex oxide is impregnated with salt-contained solution at a time and then is baked.

A still another method of allowing rhodium and platinum to be supported on zirconium complex oxide may be adopted. To cite an instance, when a salt solution or a mixed alkoxide solution, either of which contains zirconium, cerium and alkali earth metal and/or rare earth metal, is coprecipitated or hydrolyzed in the producing process of the zirconium complex oxide, a salt solution of rhodium and a salt solution of platinum are added to cause the rhodium and platinum to be coprecipitated together with the components of the zirconium complex oxides and then the coprecipitated product is oxidized.

In the exhaust gas purifying catalyst of the present invention, instead of rhodium being previously supported on the cerium complex oxide, platinum and/or palladium are previously supported thereon. The constitution that instead of rhodium being supported on the cerium complex oxide, platinum and/or palladium are supported thereon can produce the result that a quantity of rhodium used can be reduced, while the oxygen storage capacity can be developed effectively.

The method of allowing platinum and/or palladium to be supported on the cerium complex oxide is not limited to any particular method. Any of the known methods, such as the above-mentioned method, may be used. Preferably, platinum is previously supported on the cerium complex oxide. In practice, palladium salt solutions such as palladium nitrate solution, dinitrodiammine palladium nitrate solution and quadrivalent palladium ammine nitrate solution are preferably used.

In the exhaust gas purifying catalyst of the present invention, zirconium complex oxide thus obtained on which rhodium and platinum are previously supported and cerium complex oxide thus obtained on which platinum and/or palladium are previously supported are mixed. The zirconium complex oxide and the cerium complex oxide can be mixed by any known method. For example, the oxides may be formed into slurry after they are mixed, or may alternatively be mixed after they are formed into the slurry.

The exhaust gas purifying catalyst of the present invention thus obtained is preferably in the form of a coating layer formed on catalyst carrier. The catalyst carriers used are not limited to any particular catalyst carrier. For example, a known catalyst carrier, such as a honeycomb monolithic carrier formed of cordierite and the like, may be used. The exhaust gas purifying catalyst can be presented in the form of coating layer formed on the catalyst carrier, for example, by the following ways. To cite one example, zirconium complex oxide and cerium complex oxide are formed into slurries, respectively, by adding water to each of them, first, and then those slurries are mixed together. Then, the mixed slurries are coated on the catalyst carriers. After having dried at about 50–200° C. for about 1–48 hours, they are baked at about 350–1,000° C. for about 1–12 hours. To cite another example, after powder of zirconium complex oxide and powder of cerium complex oxide are mixed, they are formed into slurry by adding water thereto. Then, the slurry is coated on the catalyst carriers. After having dried at about 50–200° C. for about 1–48 hours, they may be baked further at about 350–1,000° C. for about 1–12 hours.

In the exhaust gas purifying catalyst of the present invention thus obtained, the cerium complex oxide is preferably in the proportion of 40–150 g, or further preferably 80–120 g, and the zirconium complex oxide is preferably in the proportion of 20–100 g, or further preferably 40–60g, per liter of catalyst carrier. Also, the quantity of rhodium supported is preferably less than 1 g, further preferably not more than 0.8 g, or particularly in the range of 0.2–0.5 g, per liter of catalyst carrier. The quantity of platinum supported is preferably in the range of 0.5–2 g, or further preferably 0.7–1.5 g, per liter of catalyst carrier. It should be noted that in the exhaust gas purifying catalyst of the present invention, rhodium is completely supported on zirconium complex oxide, but platinum may be supported on cerium complex oxide as well as on zirconium complex oxide. In the case where platinum is supported on cerium complex oxide as well as on zirconium complex oxide, platinum is preferably supported thereon in such a proportion that a quantity of platinum supported on the cerium complex oxide is in the range of 1–5 parts by weight, or preferably 2–3 parts by weight, per part by weight of platinum supported on the zirconium complex oxide.

When palladium is completely supported on cerium complex oxide, a quantity of palladium supported is preferably in the range of 1–5 g, or preferably 1.3–2.5 g, per liter of catalyst carrier. When palladium is supported in combination with platinum, an adequately reduced quantity of palladium is supported on cerium complex oxide.

Also, for example, alumina on which platinum and/or palladium are supported, or cerium complex oxide and alumina on which noble metals, such as rhodium, platinum and palladium, are not supported may properly be mixed in the exhaust gas purifying catalyst of the present invention, depending on its intended purposes and applications. Those materials can then be mixed at the same time when zirconium complex oxide and cerium complex oxide are respectively formed into slurries by adding water thereto. Alternatively, they may be formed into their respective slurries and then mixed in the slurries including zirconium complex oxide and the cerium complex oxide.

When alumina on which platinum and/or palladium are supported is mixed in the exhaust gas purifying catalyst of the present invention, alumina is preferably mixed in the proportion of 20–150 g or further preferably 35–100 g. The quantity of platinum supported is preferably in the range of 0.1–2 g, or further preferably 0.5–1.5 g, per liter of catalyst carrier. The quantity of palladium supported is preferably in the range of 0.5–5 g, or further preferably 0.7–2.5 g, per liter of catalyst carrier.

The exhaust gas purifying catalyst of the present invention may be presented in the form of an outermost layer of a coating layer having multiple layers (an outermost layer of at least two layers) and formed on the catalyst carrier, as well as in the form of single layer formed on the catalyst carrier. When it is presented in the form of a multilayer, the slurries containing components of their respective layers may be coated on the catalyst carrier one after another and then dried and baked for each layer in sequence.

For example, when the exhaust gas purifying catalyst of the present invention is presented in the form of a two layer, the exhaust gas purifying catalyst of the present invention is formed on a first layer (a lower layer) directly coated on the catalyst carrier as a second layer (an upper layer). In this case, it is preferable that a total amount of alumina, zirconium complex oxide and cerium complex oxide contained in the first and second layers falls within the range mentioned above Preferably used as the component of the lower layer is, for example, at least one component selected from cerium complex oxide, zirconium complex oxide and alumina. For instance, cerium complex oxide in the range of 20–70 g and alumina in the range of 20–100 g per liter of catalyst carrier are preferably used. Platinum and palladium may also be supported on the lower layer. The quantity of platinum and palladium supported are preferably in the range of 0.4–5 g respectively per liter of catalyst carrier. Palladium is preferably supported. It is preferable that the platinum and palladium are supported on cerium complex oxide and/or alumina.

For supporting palladium, it is preferable that the layer on which palladium is supported further comprises sulfate, carbonate, nitrate and/or acetate of Ba, Ca, Sc, Mg and La. When these sulfate, carbonate, nitrate and/or acetate are contained in that layer, the catalyst is prevented from being poisoned, for example, by hydrocarbon (HC) of palladium, so that the catalytic activity is prevented from being deteriorated. The proportion in which the sulfate, carbonate, nitrate and/or acetate are contained is properly selected, depending on the intended purposes and applications. The layers containing the sulfate, carbonate, nitrate and/or acetate may be formed, for example, by mixing sulfate, carbonate, nitrate and/or acetate in the slurries used for forming the respective layers.

The exhaust gas purifying catalyst of the present invention thus obtained can require only a small quantity of rhodium supported that exhibits the excellent activity for both oxidation and reduction and develops the excellent effect in purification of NOx in particular, for developing the activity effectively and producing an excellent purifying performance economically even in endurance running at high temperature. Accordingly, the exhaust gas purifying catalyst of the present invention is suitably used as the automotive exhaust gas purifying catalyst.

EXAMPLES

In the following, the present invention will be described further specifically with reference to Examples and Comparative Examples. The present invention is not in any manner limited to the illustrated Examples and Comparative Examples.

Preparation of cerium complex oxide A 0.1 mol of cerium methoxypropylate, 0.09 mol of zirconium methoxypropylate and 0.01 mol of yttrium methoxypropylate were added to 200 ml of toluene and stirred for dissolution, whereby a mixed alcoxide solution was prepared. Then, 80 ml of deionized water was dropped to the mixed alcoxide solution to hydrolyze the alcoxide. Then, the toluene and the deionized water were distilled off from the hydrolyzed solution and evaporated for dryness to produce the precursor of $Ce_{0.50}Zr_{0.45}Y_{0.05}O_{1.97}$. This was dried through circulation drying at 60° C. for 24 hours and then was baked at 450° C. for 3 hours in an electric furnace, to thereby produce powder of cerium complex oxide A having the composition of $Ce_{0.50}Zr_{0.45}Y_{0.05}O_{1.97}$.

Preparation of zirconium complex oxide B

In accordance with the same method as in the preparation of cerium complex oxide A, powder of zirconium complex oxide B having the following composition was produced.

Zirconium complex oxide B: $Zr_{0.78}Ce_{0.16}La_{0.02}Nd_{0.04}O_{1.97}$

Example 1

Formation of lower layer:

First, palladium nitrate solution was impregnated into powder of $Al_2O_3$. After having been dried, this was baked at 600° C. for 3 hours in the electric furnace to thereby prepare powder of Pd supported $Al_2O_3$. Then, powder of Pd supported $Al_2O_3$, powder of cerium complex oxide A and powder of $BaSO_4$ were mixed and pulverized in a ball mill, and distilled water was added thereto to prepare the slurry. The slurry was applied to inner surfaces of cells of monolithic carriers (105.7 mm in diameter, 114 mm in length, and 1,000 mL in capacity, the same applied to the following) to coat the inner surfaces of the cells with the slurry. After having been dried, they were baked at 600° C. for 3 hours to thereby form the lower layers. It should be noted that the lower layers were formed to establish the proportion of 50 g of powder of Pd supported $Al_2O_3$(2.1 g of Pd supporting quantity), 45 g of cerium complex oxide A and 20 g of $BaSO_4$ per liter of monolithic carrier.

Formation of upper layer:

First, dinitrodiammine platinum nitrate solution was impregnated into powder of zirconium complex oxide B. After having been dried, this was baked at 600° C. for 3 hours in the electric furnace, so that the platinum was supported on the zirconium complex oxide B. Further, rhodium nitrate solution was impregnated into the Pt supported zirconium complex oxide B. Then, after having been dried, this was baked at 600° C. for 3 hours in the electric furnace to prepare powder of Pt—Rh supported zirconium complex oxide B.

Then, dinitrodiammine platinum nitrate solution was impregnated into powder of cerium complex oxide A. After having been dried, this was baked at 600° C. for 3 hours in the electric furnace to prepare the powder of Pt supported cerium complex oxide A.

Then, the powder of Pt—Rh supported zirconium complex oxide B, the powder of Pt supported cerium complex oxide A and the powder of $Al_2O_3$ were mixed and pulverized in the ball mill, and distilled water was added thereto to prepare the slurry. The slurry was applied to inner surfaces of cells of the monolithic carriers on which the lower layers were already formed, to coat the inner surfaces of the cells with the slurry. After having been dried, they were baked at 600° C. for 3 hours to form upper layers, whereby a two-layered exhaust gas purifying catalyst was produced.

It should be noted that the upper layers were formed to establish the proportion of 40 g of Pt—Rh supported zirconium complex oxide B (Pt supporting quantity of 0.5 g, Rh supporting quantity of 0.4 g), 70 g of Pt supported cerium complex oxide A (Pt supporting quantity of 1.0 g) and 50 g of $Al_2O_3$ per liter of monolithic carriers.

Comparative Example 1

Formation of lower layer:

The lower layers identical in component and in proportion to those of Example 1 were formed in the same operation as in Example 1.

Formation of upper layer:

First, dinitrodiammine platinum nitrate solution was impregnated into powder of zirconium complex oxide B. After having been dried, this was baked at 600° C. for 3 hours in the electric furnace, so that the platinum was supported on the zirconium complex oxide B. Further, rhodium nitrate solution was impregnated into the platinum supported zirconium complex oxide B. Then, after having been dried, this was baked at 600° C. for 3 hours in the electric furnace to prepare powder of Pt—Rh supported zirconium complex oxide B.

Then, dinitrodiammine platinum nitrate solution was impregnated into powder of cerium complex oxide A. After having been dried, this was baked at 600° C. for 3 hours in the electric furnace, so that platinum was supported on the cerium complex oxide A. Further, the rhodium nitrate solution was impregnated into the Pt supported cerium complex oxide A. Then, after having been dried, this was baked at 600° C. for 3 hours in the electric furnace to prepare powder of Pt—Rh supported cerium complex oxide A.

Then, the powder of Pt—Rh supported zirconium complex oxide B, the powder of Pt—Rh supported cerium complex oxide A and the powder of $Al_2O_3$ were mixed and pulverized in the ball mill, and distilled water was added thereto to prepare the slurry. The slurry was applied to inner surfaces of cells of the monolithic carriers on which the lower layers were already formed, to coat the inner surfaces of the cells with the slurry. After having been dried, they were baked at 600° C. for 3 hours to form upper layers, whereby a two-layered exhaust gas purifying catalyst was produced.

It should be noted that the upper layers were formed to establish the proportion of 40 g of Pt—Rh supported zirconium complex oxide B (Pt supporting quantity of 0.5 g, Rh supporting quantity of 0.3 g), 70 g of Pt—Rh supported cerium complex oxide A (Pt supporting quantity of 1.0 g and Rh supporting quantity of 0.1 g) and 50 g of $Al_2O_3$ per liter of monolithic carriers.

Comparative Example 2

Formation of lower layer:

The lower layers identical in component and in proportion to those of Example 1 were formed in the same operation as in Example 1.

Formation of upper layer:

First, rhodium nitrate solution was impregnated into powder of zirconium complex oxide B. After having been dried, this was baked at 600° C. for 3 hours in the electric furnace to prepare powder of Rh supported zirconium complex oxide B.

Then, dinitrodiammine platinum nitrate solution was impregnated into powder of cerium complex oxide A. After having been dried, this was baked at 600° C. for 3 hours in the electric furnace to prepare powder of Pt supported cerium complex oxide A.

Then, the powder of Rh supported zirconium complex oxide B, the powder of Pt supported cerium complex oxide A and the powder of $Al_2O_3$ were mixed and pulverized in the ball mill, and distilled water was added thereto to prepare the slurry. The slurry was applied to inner surfaces of cells of the monolithic carriers on which the lower layers were already formed, to coat the inner surfaces of the cells with the slurry. After having been dried, they were baked at 600° C. for 3 hours to form upper layers, whereby a two-layered exhaust gas purifying catalyst was produced.

It should be noted that the upper layers were formed to establish the proportion of 40 g of Rh supported zirconium complex oxide B (Rh supporting quantity of 0.4 g), 70 g of Pt supported cerium complex oxide A (Pt supporting quantity of 1.5 g) and 50 g of $Al_2O_3$ per liter of monolithic carriers.

Example 2

The exhaust gas purifying catalyst identical to that of Example 1 was produced in the same operation as in Example 1, except that a single coating consisting of only the components of the upper layers was formed directly on each cell without any lower layer being formed thereon.

Comparative Example 3

The exhaust gas purifying catalyst identical to that of Comparative Example 1 was produced in the same operation as in Comparative Example 1, except that a single coating consisting of only the components of the upper layers was formed directly on each cell without any lower layer being formed thereon.

Comparative Example 4

The exhaust gas purifying catalyst identical to that of Comparative Example 2 was produced in the same operation as in Comparative Example 2, except that a single coating consisting of only the components of the upper layers was formed directly on each cell without any lower layer being formed thereon.

Example 3

Formation of lower layer:

First, palladium nitrate solution was impregnated into powder of cerium complex oxide A. After having been dried, this was baked at 600° C. for 3 hours in the electric furnace to thereby prepare powder of Pd supported cerium complex oxide A. Then, powder of Pd supported cerium complex oxide A, powder of $Al_2O_3$ and powder of $BaSO_4$ were mixed and pulverized in a ball mill, and distilled water was added thereto to prepare the slurry. The slurry was applied to inner surfaces of cells of the monolithic carriers, to coat the inner surfaces of the cells with the slurry. After having been dried, they were baked at 600° C. for 3 hours to thereby form the lower layers. It should be noted that the lower layers were formed to establish the proportion of 45 g of Pd supported cerium complex oxide A (Pd supporting quantity of 2.1 g), 50 g of $Al_2O_3$ and 20 g of $BaSO_4$ per liter of monolithic carrier.

Formation of upper layer:

First, dinitrodiammine platinum nitrate solution was impregnated into powder of zirconium complex oxide B.

After having been dried, this was baked at 600° C. for 3 hours in the electric furnace, so that the platinum was supported on the zirconium complex oxide B. Further, rhodium nitrate solution was impregnated into the Pt supported zirconium complex oxide B. Then, after having been dried, this was baked at 600° C. for 3 hours in the electric furnace to prepare powder of Pt—Rh supported zirconium complex oxide B.

Then, dinitrodiammine platinum nitrate solution was impregnated into powder of cerium complex oxide A. After having been dried, this was baked at 600° C. for 3 hours in the electric furnace to prepare the powder of Pt supported cerium complex oxide A.

Then, the powder of Pt—Rh supported zirconium complex oxide B, the powder of Pt supported cerium complex oxide A and the powder of $Al_2O_3$ were mixed and pulverized in the ball mill, and distilled water was added thereto to prepare the slurry. The slurry was applied to inner surfaces of cells of the monolithic carriers on which the lower layers were already formed, to coat the inner surfaces of the cells with the slurry. After having been dried, they were baked at 600° C. for 3 hours to form upper layers, whereby a two-layered exhaust gas purifying catalyst was produced.

It should be noted that the upper layers were formed to establish the proportion of 40 g of Pt—Rh supported zirconium complex oxide B (Pt supporting quantity of 0.75 g, Rh supporting quantity of 0.4 g), 70 g of Pt supported cerium complex oxide A (Pt supporting quantity of 0.75 g) and 50 g of $Al_2O_3$ per liter of monolithic carriers.

Example 4

The exhaust gas purifying catalyst identical to that of Example 3 was produced in the same operation as in Example 3, except that a single coating consisting of only the components of the upper layers was formed directly on each cell without any lower layer being formed thereon.

Example 5

First, dinitrodiammine platinum nitrate solution was impregnated into powder of zirconium complex, oxide B. After having been dried, this was baked at 600° C. for 3 hours in the electric furnace, so that the platinum was supported on the zirconium complex oxide B. Further, rhodium nitrate solution was impregnated into the Pt supported zirconium complex oxide B. Then, after having been dried, this was baked at 600° C. for 3 hours in the electric furnace to prepare powder of Pt—Rh supported zirconium complex oxide B.

Then, dinitrodiammine platinum nitrate solution was impregnated into powder of cerium complex oxide A. After having been dried, this was baked at 600° C. for 3 hours in the electric furnace to prepare the powder of Pt supported cerium complex oxide A.

Further, dinitrodiammine platinum nitrate solution was impregnated into powder of $Al_2O_3$. After having been dried, this was baked at 600° C. for 3 hours in the electric furnace to prepare the powder of Pt supported $Al_2O_3$.

Then, the powder of Pt—Rh supported zirconium complex oxide B, the powder of Pt supported cerium complex oxide A and the powder of Pt supported $Al_2O_3$ were mixed and pulverized in the ball mill, and distilled water was added thereto to prepare the slurry. The slurry was applied to inner surfaces of cells of the monolithic carriers, to coat the inner surfaces of the cells with the slurry. After having been dried, they were baked at 600° C. for 3 hours to produce the exhaust gas purifying catalyst.

It should be noted that the exhaust gas purifying catalyst was formed to establish the proportion of 40 g of Pt—Rh supported zirconium complex oxide B (Pt supporting quantity of 0.5 g, Rh supporting quantity of 0.4 g), 70 g of Pt supported cerium complex oxide A (Pt supporting quantity of 0.5 g) and 50 g of Pt supported $Al_2O_3$ per liter of monolithic carriers.

Example 6

Formation of lower layer:

First, palladium nitrate solution was impregnated into powder of $Al_2O_3$. After having been dried, this was baked at 600° C. for 3 hours in the electric furnace to thereby prepare powder of Pd supported $Al_2O_3$. Then, powder of Pd supported $Al_2O_3$, powder of cerium complex oxide A and powder of BaSO4 were mixed and pulverized in a ball mill, and distilled water was added thereto to prepare the slurry. The slurry was applied to inner surfaces of cells of the monolithic carriers, to coat the inner surfaces of the cells with the slurry. After having been dried, they were baked at 600° C. for 3 hours to thereby form the lower layers. It should be noted that the lower layers were formed to establish the proportion of 50 g of powder of Pd supported $Al_2O_3$ (Pd supporting quantity of 0.4 g), 30 g of cerium complex oxide A and 20 g of $BaSO_4$ per liter of monolithic carrier.

Formation of upper layer:

First, dinitrodiammine platinum nitrate solution was impregnated into powder of zirconium complex oxide B. After having been dried, this was baked at 600° C. for 3 hours in the electric furnace, so that the platinum was supported on the zirconium complex oxide B. Further, rhodium nitrate solution was impregnated into the Pt supported zirconium complex oxide B. Then, after having been dried, this was baked at 600° C. for 3 hours in the electric furnace to prepare powder of Pt—Rh supported zirconium complex oxide B.

Then, dinitrodiammine platinum nitrate solution was impregnated into powder of cerium complex oxide A. After having been dried, this was baked at 600° C. for 3 hours in the electric furnace to prepare the powder of Pt supported cerium complex oxide A.

Further, dinitrodiammine platinum nitrate solution was impregnated into powder of $Al_2O_3$. After having been dried, this was baked at 600° C. for 3 hours in the electric furnace to prepare the powder of Pt supported $Al_2O_3$.

Then, the powder of Pt—Rh supported zirconium complex oxide B, the powder of Pt supported cerium complex oxide A and the powder of Pt supported $Al_2O_3$ were mixed and pulverized in the ball mill, and distilled water was added thereto to prepare the slurry. The slurry was applied to inner surfaces of cells of the monolithic carriers on which the lower layers were already formed, to coat the inner surfaces of the cells with the slurry. After having been dried, they were baked at 600° C. for 3 hours to form upper layers, whereby a two-layered exhaust gas purifying catalyst was produced.

It should be noted that the upper layers were formed to establish the proportion of 40 g of Pt—Rh supported zirconium complex oxide B (Pt supporting quantity of 0.175 g, Rh supporting quantity of 0.7 g), 70 g of Pt supported cerium complex oxide A (Pt supporting quantity of 0.175 g) and 70 g of powder of Pt supported $Al_2O_3$ (Pt supporting quantity of 0.35 g) per liter of monolithic carriers.

Example 7

First, dinitrodiammine platinum nitrate solution was impregnated into powder of zirconium complex oxide B.

After having been dried, this was baked at 600° C. for 3 hours in the electric furnace, so that the platinum was supported on the zirconium complex oxide B. Further, rhodium nitrate solution was impregnated into the Pt supported zirconium complex oxide B. Then, after having been dried, this was baked at 600° C. for 3 hours in the electric furnace to prepare powder of Pt—Rh supported zirconium complex oxide B.

Then, dinitrodiammine platinum nitrate solution was impregnated into powder of cerium complex oxide A. After having been dried, this was baked at 600° C. for 3 hours in the electric furnace to prepare the powder of Pt supported cerium complex oxide A.

Thereafter, dinitrodiammine platinum nitrate solution was impregnated into powder of $Al_2O_3$. After having been dried, this was baked at 600° C. for 3 hours in the electric furnace to prepare the powder of Pt supported $Al_2O_3$.

Further, palladium nitrate solution was impregnated into powder of $Al_2O_3$. After having been dried, this was baked at 600° C. for 3 hours in the electric furnace to thereby prepare powder of Pd supported $Al_2O_3$.

Then, the powder of Pt—Rh supported zirconium complex oxide B, the powder of Pt supported cerium complex oxide A, the powder of Pt supported $Al_2O_3$, the powder of Pd supported $Al_2O_3$, the powder of cerium complex oxide A and the powder of $BaSO_4$ were mixed and pulverized in the ball mill, and distilled water was added thereto to prepare the slurry. The slurry was applied to inner surfaces of cells of the monolithic carriers, to coat the inner surfaces of the cells with the slurry. After having been dried, they were baked at 600° C. for 3 hours to produce the exhaust gas purifying catalyst.

It should be noted that the exhaust gas purifying catalyst was formed to establish the proportion of 40 g of Pt—Rh supported zirconium complex oxide B (Pt supporting quantity of 0.23 g, Rh supporting quantity of 0.7 g), 70 g of Pt supported cerium complex oxide A (Pt supporting quantity of 0.23 g) and 70 g of powder of Pt supported $Al_2O_3$ (Pt supporting quantity of 0.23 g), 50 g of powder of Pd supported $Al_2O_3$ (Pd supporting quantity of 0.4 g), 30 g of cerium complex oxide A, and 20 g of $BaSO_4$ per liter of monolithic carriers.

1,150° C. Endurance Test:

A V type eight cylinder engine of 4,000 cc was loaded on a real automobile and the exhaust gas purifying catalysts of Examples and Comparative Examples were connected to a bank of the engine (4 cylinders). With the cycle shown in FIG. 1 as a single cycle (30 seconds), the cycle was repeated for 48 hours for the endurance test of the exhaust gas purifying catalysts of Examples and Comparative Examples.

Figure 1:
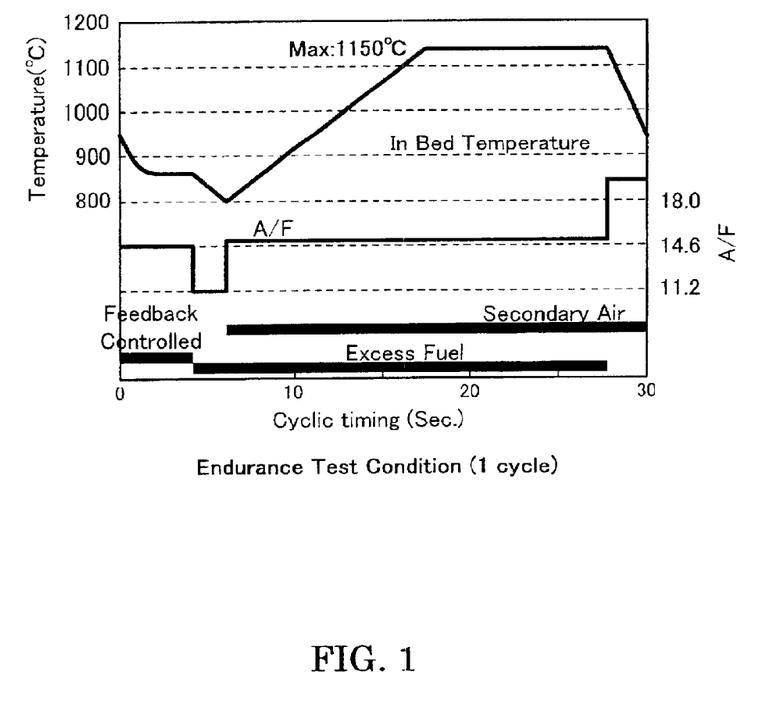
FIG. 1 is a time chart showing a process in one cycle of a 1,150° C. endurance test.

One cycle was set as shown in FIG. 1. Specifically, for 0–5 seconds, a mixed gas of gasoline and air which was kept in the stoichimetric state of amount of theoretical combustion air (A/F=14.6) under feedback control was fed to the engine and the internal temperature of the exhaust gas purifying catalysts (catalyst bed) was set to be around 850° C. For 5–7 seconds, the feedback was allowed to open and the fuel was injected excessively, so that the fuel-rich mixed gas (A/F=11.2) was fed to the engine. For 7–28 seconds, while an excessive amount of fuel was kept on being fed to the engine with the feedback open, secondary air was introduced from the outside of the engine through an inlet tube upstream of the catalytic parts, to cause the excessive fuel to react with the secondary air in the interior of the catalyst bed, so as to raise the temperature of catalyst bed. In this time period, the highest temperature was 1,150° C. and the A/F was substantially kept at the amount of theoretical combustion air of 14.8. For the last time period of 28–30 seconds, no fuel was fed but the secondary air was fed to the engine to put the engine into a lean state. The fuel was fed in the condition in which phosphorus compound was added to the gasoline. The total amount was set at 0.41 g in the endurance test by converting the amount of addition to the elements of phosphorous. The temperature of the catalyst bed was measured by thermocouple inserted into a center part of the honeycomb carrier.

Measurement of CO—NOx cross-point purifying rate

The catalytic parts of the catalysts subjected to the endurance test mentioned above were annealed at 900° C. for 2 hours. Sequentially, the mixed gas was fed to the engine, while it was varied from its fuel-rich state to its lean state. The exhaust gas produced by the combustion in the engine was purified by use of the exhaust gas purifying catalysts of Examples and Comparative Examples. The CO and NOx purifying rates were measured. A purifying rate obtained when the purifying rates of these components were coincident with each other was defined as a CO—NOx cross-point purifying rate.

It is to be noted that the measurement of the purifying rates was performed in the condition of the engine only, rather than in the condition in which the engine was mounted on the automobile. The temperature of the exhaust gas fed to the parts of the catalysts was set at 460° C. and space velocity SV was set at 80,000/h. The results are shown in TABLE 1.

TABLE 1

| | Rh supporting ratio (weight ratio) | Pt supporting ratio (weight ratio) | Coating layer | CO-$NO_x$ cross-point purifying rate (%) | Pd supported layer |
|---|---|---|---|---|---|
| Ex. 1 | Zr-based only | Zr-based:Ce-based 1:2 | Two-layer Upper layer | 96 | Lower layer $Al_2O_3$ |
| Compara. Ex. 1 | Zr-based:Ce based 1:3 | Zr-based:Ce-based 1:2 | Two-layer Upper layer | 87 | Lower layer $Al_2O_3$ |
| Compara. Ex. 2 | Zr-based only | Ce-based only | Two-layer Upper layer | 86 | Lower layer $Al_2O_3$ |
| Ex. 2 | Zr-based only | Zr-based:Ce-based 1:2 | Single layer | 92 | Nil |
| Compara. Ex. 3 | Zr-based:Ce based 1:3 | Zr-based:Ce-based 1:2 | Single layer | 82 | Nil |
| Compara. Ex. 4 | Zr-based only | Ce based only | Single layer | 76 | Nil |

TABLE 1-continued

| | Rh supporting ratio (weight ratio) | Pt supporting ratio (weight ratio) | Coating layer | CO-NO$_x$ cross-point purifying rate (%) | Pd supported layer |
|---|---|---|---|---|---|
| Ex. 3 | Zr-based only | Zr-based:Ce-based 1:1 | Two-layer Upper layer | 94 | Lower layer Ce-based |
| Ex. 4 | Zr-based only | Zr-based:Ce-based 1:1 | Single layer | 90 | Nil |
| Ex. 5 | Zr-based only | Zr-based:Ce-based:Al$_2$O$_3$ 1:1:1 | Single layer | 91 | Nil |
| Ex. 6 | Zr-based only | Zr-based:Ce-based:Al$_2$O$_3$ 1:1:2 | Two-layer Upper layer | 92 | Lower layer Al$_2$O$_3$ |
| Ex. 7 | Zr-based only | Zr-based:Ce-based:Al$_2$O$_3$ 1:1:1 | Single layer | 90 | Al$_2$O$_3$ |

Note:
Zr-based:Zirconium complex oxide;
Ce-based:Cerium complex oxide

In TABLE 1, supporting ratios (weight ratio) of rhodium and platinum to zirconium complex oxide, cerium complex oxide and Al$_2$O$_3$ are also shown.

While the illustrative examples of the present invention are provided in the above description, such is for illustrative purpose only and it is not to be construed restrictively. Modification and variation of the present invention that will be obvious to those skilled in the art is to be covered in the following claims.

What is claimed is:

1. An exhaust gas purifying catalyst comprising:
   a lower layer directly coated on a catalyst and an upper layer formed on the lower layer, wherein
   the lower layer comprises an alumina
   the upper layer comprises a zirconium complex oxide supporting rhodium and platinum thereon, and a cerium complex oxide supporting platinum thereon; and
   palladium is supported only on the alumina of the lower layer.

2. The exhaust gas purifying catalyst according to claim 1, wherein the zirconium complex oxide comprises zirconium and cerium in the proportion of a zirconium content being more than a cerium content, and wherein the cerium complex oxide comprises cerium and zirconium in the proportion of a cerium content being more than a zirconium content.

3. The exhaust gas purifying catalyst according to claim 2, wherein the zirconium complex oxide is a heat resisting oxide expressed by the general formula (1) given below:

$$Zr_{1-(a+b)}Ce_aN_bO_{2-c} \quad (1)$$

(In the formula, N represents alkali earth metal or rare earth metal, c represents oxygen vacancy, a represents a proportion of atom of 0.10–0.35, b represents a proportion of atom of 0–0.20, and 1–(a+b) represents a proportion of atom of 0.45–0.90), and
wherein the cerium complex oxide is the heat-resisting oxide expressed by the general formula (2) given below:

$$Ce_{1-(x+y)}Zr_xM_yO_{2-z} \quad (2)$$

(In the formula, M represents alkali earth metal or rare earth metal, z represents oxygen vacancy, x represents a proportion of atom of 0.20–0.70, y represents a proportion of atom of 0–0.20, and 1–(x+y) represents a proportion of atom of 0.10–0.80).

4. The exhaust gas purifying catalyst according to claim 3, wherein the alkali earth metal represented by N in the general formula (1) and the alkali earth metal represented by M in the general formula (2) comprises at least one material selected from the group consisting of Mg, Ca, Sr and Ba, and wherein the rare earth metal represented by N in the general formula (1) and the rare earth metal represented by M in the general formula (2) comprises at least one material selected from the group consisting of Y, Sc, La, Pr and Nd.

5. The exhaust gas purifying catalyst according to claim 1, which is in the form of a coating layer formed on a catalyst carrier.

6. The exhaust gas purifying catalyst according to claim 1, wherein a quantity of rhodium supported is less than 1 g per liter of catalyst carrier.

7. The exhaust gas purifying catalyst according to claim 1, wherein at least a part of the zirconium complex oxide and/or the cerium complex oxide is a solid solution.

8. The exhaust gas purifying catalyst according to claim 1, wherein the platinum to be supported on the zirconium complex oxide and on the cerium complex oxide is supported in a proportion that a quantity of the platinum supported on the cerium complex oxide is in the range of 1–5 parts by weight per part by weight of the platinum supported on the zirconium complex oxide.

9. An exhaust gas purifying catalyst comprising:
   a lower layer directly coated on a catalyst and an upper layer formed on the lower layer, wherein
   the lower layer comprises an alumina;
   the upper layer comprises a zirconium complex oxide supporting rhodium and platinum thereon, a cerium complex oxide supporting platinum thereon and an alumina supporting platinum thereon; and
   palladium is supported only on the alumina of the lower layer.

10. The exhaust gas purifying catalyst according to claim 9, wherein the zirconium complex oxide comprises zirconium and cerium in the proportion of a zirconium content being more than a cerium content, and wherein the cerium complex oxide comprises cerium and zirconium in the proportion of a cerium content being more than a zirconium content.

11. The exhaust gas purifying catalyst according to claim 10, wherein the zirconium complex oxide is a heat resisting oxide expressed by the general formula (1) given below:

$$Zr_{1-(a+b)}Ce_aN_bO_{2-c} \quad (1)$$

(In the formula, N represents alkali earth metal or rare earth metal, c represents oxygen vacancy, a represents a proportion of atom of 0.10–0.35, b represents a proportion of atom of 0–0.20, and 1–(a+b) represents a proportion of atom of 0.45–0.90), and wherein the cerium complex oxide is the heat-resisting oxide expressed by the general formula (2) given below:

$$Ce_{1-(x+y)}Zr_xM_yO_{2-z} \quad (2)$$

(In the formula, M represents alkali earth metal or rare earth metal, z represents oxygen vacancy, x represents a proportion of atom of 0.20–0.70, y represents a proportion of atom of 0–0.20, and 1–(x+y) represents a proportion of atom of 0.10–0.80).

12. The exhaust gas purifying catalyst according to claim 11, wherein the alkali earth metal represented by N in the general formula (1) and the alkali earth metal represented by M in the general formula (2) comprises at least one material selected from the group consisting of Mg, Ca, Sr and Ba, and wherein the rare earth metal represented by N in the general formula (1) and the rare earth metal represented by M in the general formula (2) comprises at least one material selected from the group consisting of Y, Sc, La, Pr and Nd.

13. The exhaust gas purifying catalyst according to claim 9, which is in the form of a coating layer formed on a catalyst carrier.

14. The exhaust gas purifying catalyst according to claim 9, wherein a quantity of rhodium supported is less than 1 g per liter of catalyst carrier.

15. The exhaust gas purifying catalyst according to claim 9, wherein at least a part of the zirconium complex oxide and/or the cerium complex oxide is a solid solution.

16. The exhaust gas purifying catalyst according to claim 9, wherein the platinum to be supported on the zirconium complex oxide and on the cerium complex oxide is supported in a proportion that a quantity of the platinum supported on the cerium complex oxide is in the range of 1–5 parts by weight per part by weight of the platinum supported on the zirconium complex oxide.

* * * * *